(12) United States Patent
Hirtenlehner et al.

(10) Patent No.: US 12,065,113 B2
(45) Date of Patent: Aug. 20, 2024

(54) TOOTHED HOLDING BRAKE FOR A VEHICLE DOOR AND METHOD FOR OPERATING A TOOTHED HOLDING BRAKE

(71) Applicant: KNORR-BREMSE GESELLSCHAFT MIT BESCHRÄNKTER HAFTUNG, Mödling (AT)

(72) Inventors: Thomas Hirtenlehner, Wolfsbach (AT); Peter Jetzinger, Enns (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 720 days.

(21) Appl. No.: 17/269,180

(22) PCT Filed: Aug. 14, 2019

(86) PCT No.: PCT/EP2019/071775
§ 371 (c)(1),
(2) Date: Feb. 17, 2021

(87) PCT Pub. No.: WO2020/035517
PCT Pub. Date: Feb. 20, 2020

(65) Prior Publication Data
US 2021/0317693 A1    Oct. 14, 2021

(30) Foreign Application Priority Data
Aug. 17, 2018  (DE) .............. 10 2018 120 116.8

(51) Int. Cl.
*F16D 59/02*      (2006.01)
*B60T 1/00*       (2006.01)
(Continued)

(52) U.S. Cl.
CPC .............. *B60T 17/22* (2013.01); *B60T 1/005* (2013.01); *B60T 13/748* (2013.01); *E05C 17/50* (2013.01);
(Continued)

(58) Field of Classification Search
CPC .............. F16D 63/006; F16D 2121/22; F16D 2027/008; F16D 2066/003; F16D 59/02;
(Continued)

(56) References Cited

U.S. PATENT DOCUMENTS 3,400,797 A     9/1968  Horn et al.
3,415,347 A  *  12/1968  Wrensch ............... F16D 55/00
                                                      192/84.961
(Continued)

FOREIGN PATENT DOCUMENTS

CN    101115937 A    1/2008
CN    104455073 A    3/2015
(Continued)

OTHER PUBLICATIONS

International Search Report and Written Opinion corresponding to PCT/EP2019/071775, dated Nov. 15, 2019.

*Primary Examiner* — Bradley T King
(74) *Attorney, Agent, or Firm* — Barnes & Thornburg LLP

(57) ABSTRACT

A toothed holding brake for a vehicle door has a shaft, an armature plate, a magnet device and a detection device. The armature plate has a first and second main surfaces arranged opposite one another, wherein an armature-plate toothed rim having a plurality of armature teeth is arranged on the second main surface. The armature plate is arranged in a locking position such that the armature teeth mesh in the carry-along teeth to prevent rotation of the shaft in at least one direction, and is arranged in a release position such that
(Continued)

the armature teeth are arranged at a distance from the carry-along teeth to enable rotation of the shaft in both directions. The magnet device has a magnet main surface arranged facing the armature plate, wherein the magnet device is designed to move the armature plate between the locking position and the release position.

20 Claims, 12 Drawing Sheets

(51) Int. Cl.
    *B60T 13/74*        (2006.01)
    *B60T 17/22*        (2006.01)
    *E05C 17/50*        (2006.01)
    *G01D 5/14*         (2006.01)
    *H02K 1/2795*     (2022.01)
    *H02K 49/04*       (2006.01)
    *H02K 49/10*       (2006.01)

(52) U.S. Cl.
    CPC .............. *G01D 5/14* (2013.01); *H02K 1/2795* (2022.01); *H02K 49/046* (2013.01); *H02K 49/108* (2013.01)

(58) Field of Classification Search
    CPC ........ B60T 17/22; B60T 1/005; B60T 13/748; H02K 49/046; H02K 49/108
    See application file for complete search history.

(56) References Cited

U.S. PATENT DOCUMENTS

| | | | | |
|---|---|---|---|---|
| 4,773,518 A | * | 9/1988 | Raad | F16D 27/118 |
| | | | | 192/84.1 |
| 4,838,391 A | * | 6/1989 | Schenk | F16D 59/02 |
| | | | | 192/109 A |
| 6,269,917 B1 | * | 8/2001 | Harting | F16D 63/006 |
| | | | | 188/161 |
| 6,439,355 B1 | * | 8/2002 | Kimble | F16D 55/227 |
| | | | | 188/161 |
| 7,626,288 B2 | * | 12/2009 | Protze | H01F 7/1607 |
| | | | | 335/279 |
| 2004/0040801 A1 | * | 3/2004 | Yamamoto | B60T 13/748 |
| | | | | 188/161 |
| 2007/0187193 A1 | * | 8/2007 | Tarhan | H02K 7/1025 |
| | | | | 188/171 |
| 2008/0156594 A1 | | 7/2008 | Kobayashi | |
| 2008/0314701 A1 | * | 12/2008 | Bogelein | F16D 55/28 |
| | | | | 188/171 |
| 2012/0019050 A1 | | 1/2012 | Feusse | |

FOREIGN PATENT DOCUMENTS

| | | |
|---|---|---|
| CN | 105637251 A | 6/2016 |
| DE | 19719990 A1 | 11/1998 |
| FR | 2856854 A1 | 12/2004 |
| WO | 0221022 A1 | 3/2002 |
| WO | 2010001827 A1 | 1/2010 |
| WO | 2016187631 A1 | 12/2016 |

* cited by examiner

TOOTHED HOLDING BRAKE FOR A VEHICLE DOOR AND METHOD FOR OPERATING A TOOTHED HOLDING BRAKE

CROSS REFERENCE AND PRIORITY CLAIM

This patent application is a U.S. National Phase of International Patent Application No. PCT/EP2019/071775 filed Aug. 14, 2019, which claims priority to German Patent Application No. 10 2018 120 116.8, the disclosure of which being incorporated herein by reference in their entireties.

FIELD

Disclosed embodiments relate to a toothed holding brake for a door for a vehicle, and to a method for operating a toothed holding brake.

BACKGROUND

In the case of toothed holding brakes for door braking systems for vehicles, it is important for it to be possible for a locked and unlocked state of the toothed holding brake to be detected.

SUMMARY

Against this background, disclosed embodiments provide an improved toothed holding brake for a door for a vehicle, and a method for operating an improved toothed holding brake. This may be achieved by way of a toothed holding brake for a door for a vehicle and by way of a method for operating a toothed holding brake disclosed herein.

BRIEF DESCRIPTION OF FIGURES

Exemplary embodiments of the approach which is proposed here will be described in greater detail in the following description with reference to the Figures, in which.

Figure 1:
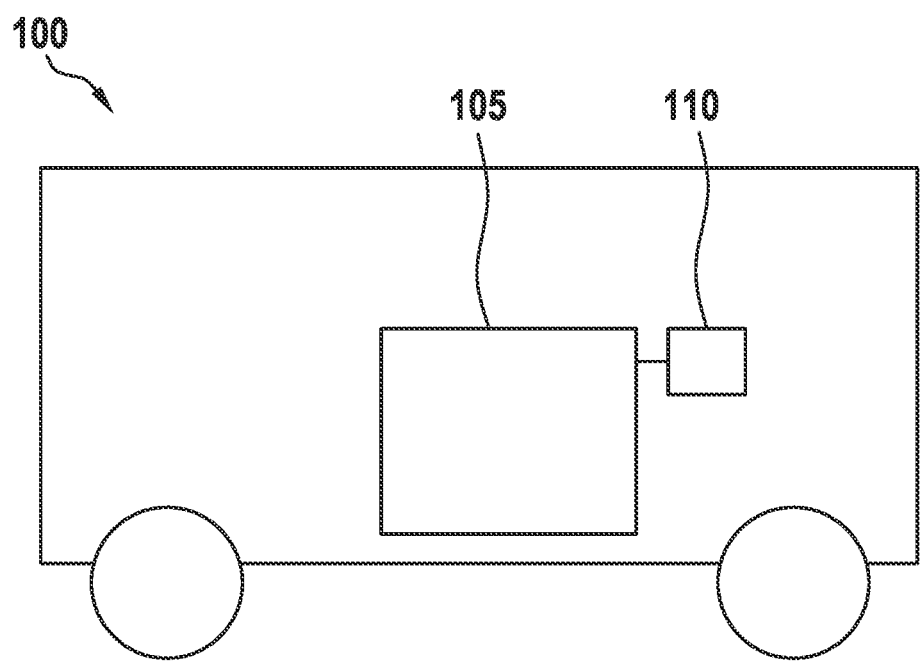
FIG. 1 shows a diagrammatic illustration of a vehicle with a door with a toothed holding brake in accordance with one exemplary embodiment, FIGS. 2 to 5 in each case show a diagrammatic cross-sectional illustration of a toothed holding brake in accordance with one exemplary embodiment.

In the following description of favorable exemplary embodiments of the present approach, identical or similar designations are used for the elements which are shown in the various Figures and have a similar action, a repeated description of the elements being dispensed with.

DETAILED DESCRIPTION

WO 2016/187631 A1 describes an apparatus for the detection of the instantaneous position of a component which can be moved to and fro between two positions by means of an electromagnetic field, in particular the counterdisk of a toothed disk, a magnetically or electromagnetically actuable brake or clutch, in particular in the door drive of a vehicle such as a railcar.

Against this background, disclosed embodiments provide an improved toothed holding brake for a door for a vehicle, and a method for operating an improved toothed holding brake for a door for a vehicle. Disclosed embodiments provide a toothed holding brake with an armature disk, by way of which, with the use of a very simple functional principle, an unlocked state and a locked state of the toothed holding brake can be reliably detected rapidly and simply by way of sensing of the armature disk. Here, the armature disk can advantageously be sensed directly, with the result that additional components are not required.

A toothed holding brake for a door for a vehicle has a shaft, an armature disk, a magnet device and a detection device. At one end, the shaft forms a driver element with a driver main surface with a driver toothed rim which has a plurality of driver teeth. The armature disk has a first main surface and a second main surface which is arranged so as to lie opposite the first main surface, an armature disk toothed rim with a plurality of armature teeth being arranged on the second main surface.

In a locked position, the armature disk is arranged such that the armature teeth engage into the driver teeth, in order to prevent a rotation of the shaft in at least one direction, and, in an unlocked position, is arranged such that the armature teeth are arranged spaced apart from the driver teeth, in order to release the rotation of the shaft in both directions. The magnet device has a magnet main surface which is arranged so as to face the armature disk, the magnet device being configured to move the armature disk between the locked position and the unlocked position. In the locked position of the armature disk, the first main surface of the armature disk and the magnet main surface are arranged so as to run substantially obliquely with respect to one another. The detection device is configured to detect the locked position and, in addition or as an alternative, the unlocked position.

In the case of the disclosed toothed holding brake, which can also be called a safety brake, a coupling piece with a toothing system, that is to say the armature disk here, can be moved to and fro by way of, for example, electromagnetic forces between a position which corresponds to a locked position and a position which corresponds to a released unlocked position. The toothed holding brake can be applied for use for a door drive for, for example, a railroad door, or else for an elevator door, and can also be used in the case of elevators, in the case of wire rope hoists and every type of force or torque transmission means. It is important for the toothed holding brake to communicate an instantaneous or current position of the armature disk to a regulation and control apparatus, in order for it to be possible for the position to be monitored and for operation of the entire system which is connected to the toothed holding brake to be regulated in accordance with this.

The armature disk can also be called an armature element. A main surface is to be understood to mean a larger or largest surface in comparison with further possible surfaces of an element. A main surface of this type can be, for example, a top side or bottom side or front side or rear side of an element which is flat or disk-shaped overall. The armature disk toothed rim is advantageously formed such that it can be connected in a positively locking manner to, for example can be interlocked with, the driver toothed rim of the driver element. The armature disk toothed rim can be arranged on the second main surface or in a recess which is arranged in the second main surface. Therefore, the armature teeth of the armature disk toothed rim can protrude completely or partially beyond the second main surface or can be arranged in a recessed manner with respect to the second main surface. Accordingly, the driver toothed rim can be arranged on the driver main surface or in a recess which is arranged in the driver main surface. Therefore, the driver teeth of the driver toothed rim can protrude completely or partially beyond the driver main surface, or can be arranged such that they are recessed with respect to the driver main surface. The fact that the first main surface of the armature disk and the magnet main surface are arranged so as to run substantially obliquely with respect to one another can mean that the first main surface and the magnet main surface run obliquely with respect to one another along an entire length or a greater proportion of the length of the armature disk and the magnet main surface. For example, in the locked position, more than half a length of the first main surface can be arranged obliquely with respect to the magnet main surface, or more than half a length of the magnet main surface can be arranged obliquely with respect to the first main surface. For example, however, the entire length of the first main surface can also be arranged obliquely with respect to the magnet main surface, or the entire length of the magnet main surface can be arranged obliquely with respect to the first main surface. In this way, a wedge-shaped air gap can be arranged between the armature disk and the magnet device in the locked position. The armature disk is arranged such that it can be tilted between the unlocked position and the locked position along a wedge-shaped air gap of this type.

The armature disk can have a first side and a second side which lies opposite the first side. Two opposite end sections of the armature disk can be understood to be the first side and the second side. The first side can also be, however, one of two substantially identical or similarly large halves of the armature disk or second main surface, and the second side can be the other half. The armature disk toothed rim can run in sections through the first side and in sections through the second side. Here, the first side can represent a side which faces the detection device, and the second side can represent a side which faces away from the detection device. Therefore, the detection device can be arranged so as to lie opposite the first side of the armature disk. The second side can be arranged so as to face a mounting part for mounting the toothed holding brake on the door. For example, the mounting part can be a casement of the toothed holding brake.

The armature disk can be arranged between the magnet device and the shaft. Here, in the locked position, a wedge-shaped air gap can be arranged between the magnet device and the armature disk. The air gap can be arranged so as to run perpendicularly with respect to the armature teeth. Therefore, the armature disk can be moved to and fro with the use of a magnetic field between the locked position and the unlocked position between the magnet device and the driver element of the shaft. In the unlocked position, the armature disk can be arranged so as to face the magnet device or so as to bear against the magnet device.

It is advantageous here if the air gap is wider on the first side of the armature disk than on the second side of the armature disk. An air gap of this type makes a large stroke in the region of the first side of the armature disk and at the same time a large magnetic force in the region of the second side of the armature disk possible.

In accordance with one embodiment, the armature disk can be formed in a wedge-shaped manner. In this way, in the locked position, a wedge-shaped air gap can be realized between the armature disk and the magnet device.

Here, a spacing between the first main surface of the armature disk and the second main surface of the armature disk can be smaller on the first side of the armature disk than on the second side of the armature disk, which second side lies opposite the first side. Here, the first and the second main surface can be arranged so as to run substantially obliquely with respect to one another between the first side and the second side. "Substantially obliquely" can mean that the first main surface and the second main surface run obliquely with respect to one another along an entire length or a greater proportion of the length between the first side and the second side of the armature disk. In this way, the armature disk can be formed in a wedge-shaped manner. For example, more than half a length of the second main surface between the first and the second side can be arranged obliquely with respect to the first main surface, that is to say can be of wedge-shaped configuration. For example, however, the entire length of the second main surface between the first and the second side can also be arranged obliquely with respect to the first main surface, or the entire length of the first main surface between the first and the second side can be arranged obliquely with respect to the second main surface, that is to say can be completely of wedge-shaped configuration.

An oblique or tilted or tiltable arrangement of the armature disk between the magnet device and the driver element is made possible by way of a wedge-shaped armature disk which is presented here. A stroke between the magnet device and the driver element, along which the armature disk moves between the unlocked position and the locked position, can advantageously be dimensioned here to be so long on the first side that a limit switch can be used as the detection device for the detection of the unlocked position and the locked position, which limit switch is configured to advantageously detect the unlocked position and the locked position of the armature disk by way of a direct mechanical contact with the armature disk. The stroke can be smaller on the second side than on the first side, in order for it to be possible for the movement of the armature disk by way of the magnet device to be ensured.

An extent length of at least a plurality of armature teeth which are situated on the first side can be equal to an extent length of at least a plurality of armature teeth which are situated on the second side. In addition or as an alternative, a further extent length of a plurality of driver teeth which are situated on a further first side of the driver main surface can be greater than a further extent length of at least a plurality of driver teeth which are situated on an opposite further second side of the driver main surface. In this way, the armature disk toothed rim and the driver toothed rim can be formed with continuously identical teeth.

As an alternative, however, an extent length of at least a plurality of armature teeth which are situated on the first side can also be greater than an extent length of at least a plurality of armature teeth which are situated on the second side and, in addition or as an alternative, a further extent length of a plurality of driver teeth which are situated on a further first side of the driver main surface can be equal to a further extent length of at least a plurality of driver teeth which are situated on an opposite further second side of the driver main surface. Therefore, the armature teeth or the driver teeth can be longer in a rim section of the toothed rim, which rim section is arranged so as to face the detection device, than in a further rim section which faces away from the detection device. As a result, a compact configuration of the armature disk overall is possible. Moreover, very long armature teeth or driver teeth in the region of the detection device make a partially locked position which is situated between the unlocked position and the locked position possible, or a corresponding partially locked state, in which the toothed overlap is smaller than in the locked position.

It is advantageous, furthermore, if a first surface section of the first main surface on the second side of the armature disk and an opposite second surface section of the second main surface on the second side are arranged parallel to one another. The surface sections can have, for example, an edge section which can represent, for example, a length of one seventh of an overall length of the first and, in addition or as an alternative, second main surface. In the locked position of the armature disk, the edge section of the second main surface of the armature disk and the magnet main surface can be arranged so as to run substantially parallel to one another. As a result, in the case of the transition from the locked position into the unlocked position, a tilting movement can be realized. If the second edge section is therefore arranged or can be arranged parallel to the magnet device, this makes a high magnetic force on the armature disk possible.

In accordance with one embodiment, the magnet main surface can be arranged so as to run substantially obliquely with respect to the driver main surface. The magnet device can therefore be beveled on the side of the armature disk. This permits the use of the armature disk, in the case of which use the first main surface and the second main surface are arranged so as to run parallel to one another, the wedge-shaped air gap nevertheless being realized between the magnet main surface and the first main surface in the locked position.

In accordance with one advantageous embodiment, the detection device can be arranged and configured so as to make mechanical contact with the armature disk in the locked position. In addition or as an alternative, in the unlocked position and in a partially locked state which is situated between the unlocked position and the locked position, the detection device can be arranged and configured so as not to make contact with the armature disk. The detection device can also be configured to output a locked signal in response to the contact. In addition or as an alternative, the detection device can be configured to output an unlocked signal in response to no contact. The partially locked position or the partially locked state can be understood to mean a state, in which a tooth engagement of the armature teeth into the driver teeth is smaller than in the locked position. As a result of the described direct mechanical contact, the detection of the described positions is made unambiguously possible rapidly and simply without further components.

Furthermore, it is advantageous if the detection device in accordance with one embodiment is arranged on the first side of the armature disk. The first side can have a first edge section of the armature disk, which first edge section makes contact with the detection device in the locked position. Since, in the case of a wedge-shaped armature disk, the first side is formed to be narrower than the second side, a particularly large stroke is made possible between the magnet device and the armature disk in the region of the first side. In the case of a parallel armature disk with an obliquely running magnet main surface, a particularly large stroke is also made possible between the magnet device and the armature disk in the region of the first side. For example, therefore, a stroke of more than 2 or more than 3 mm can be realized. A large stroke of this type is essential for a reliable detection of the detection device, for example in the form of a limit switch.

A method for operating a toothed holding brake in one of the above-described variants comprises an operation of effecting and an operation of triggering. In the operation of effecting, a movement of the armature disk from the unlocked position into the locked position is effected, in order to prevent the rotation of the shaft in at least one direction. In the operation of triggering, a movement of the armature disk from the locked position into the unlocked position is triggered, in order to release the rotation of the shaft in both directions.

FIG. 1 shows a diagrammatic illustration of a vehicle 100 with a door 105 with a toothed holding brake 110 in accordance with one exemplary embodiment.

Merely by way of example, the toothed holding brake 110 in accordance with this exemplary embodiment is arranged on the door 105 of the vehicle 100 which is formed as a rail vehicle in accordance with this exemplary embodiment.

According to this exemplary embodiment, the toothed holding brake 110 is fastened by way of a mounting part rigidly to a railcar body or door frame of the door 105. In accordance with one exemplary embodiment, the mounting part is a casement, see also FIG. 2 in this regard. The toothed holding brake 110 comprises a shaft which can be rotated about an axis in the case of an actuation of the door 105. The shaft which can also be called an actuating shaft has, at one end, a driver toothed rim or is connected to a driver toothed rim fixedly for conjoint rotation and/or in an axially fixed manner.

In the case of an actuation of the door 105, a railroad door in accordance with this exemplary embodiment, the toothed holding brake 110 serves according to this exemplary embodiment to either release or to lock a rotation of the shaft. In order to effect releasing or locking of the shaft, an armature disk is arranged fixedly for conjoint rotation in the toothed holding brake 110 as a counterdisk for the driver element of the shaft. The armature disk is arranged such that it can be moved in the direction of the axis of the shaft between two positions, with the result that an armature disk toothed rim of the armature disk either engages into the driver toothed rim of the driver element in order to lock the shaft, or does not engage, in order to release the shaft.

FIGS. 2, 3, 5, 11 and 12 show a closed or blocking position which is called a locked position in the following text, in which an armature disk toothed rim of the movable armature disk meshes with the driver teeth of the driver element, and therefore impedes the latter together with the shaft in at least one direction. In the locked position, a rotation of the driver element in both directions is prevented by way of the armature disk. If the toothed holding brake 110 comprises an optional freewheel, the rotation of a section of the shaft, which section is released by way of the freewheel, is possible in one direction in the locked position, but is locked in the other direction.

In the locked position, a gap is situated between the magnet device and the armature disk, which gap is formed in a wedge-shaped manner in accordance with one exemplary embodiment.

Figure 4:
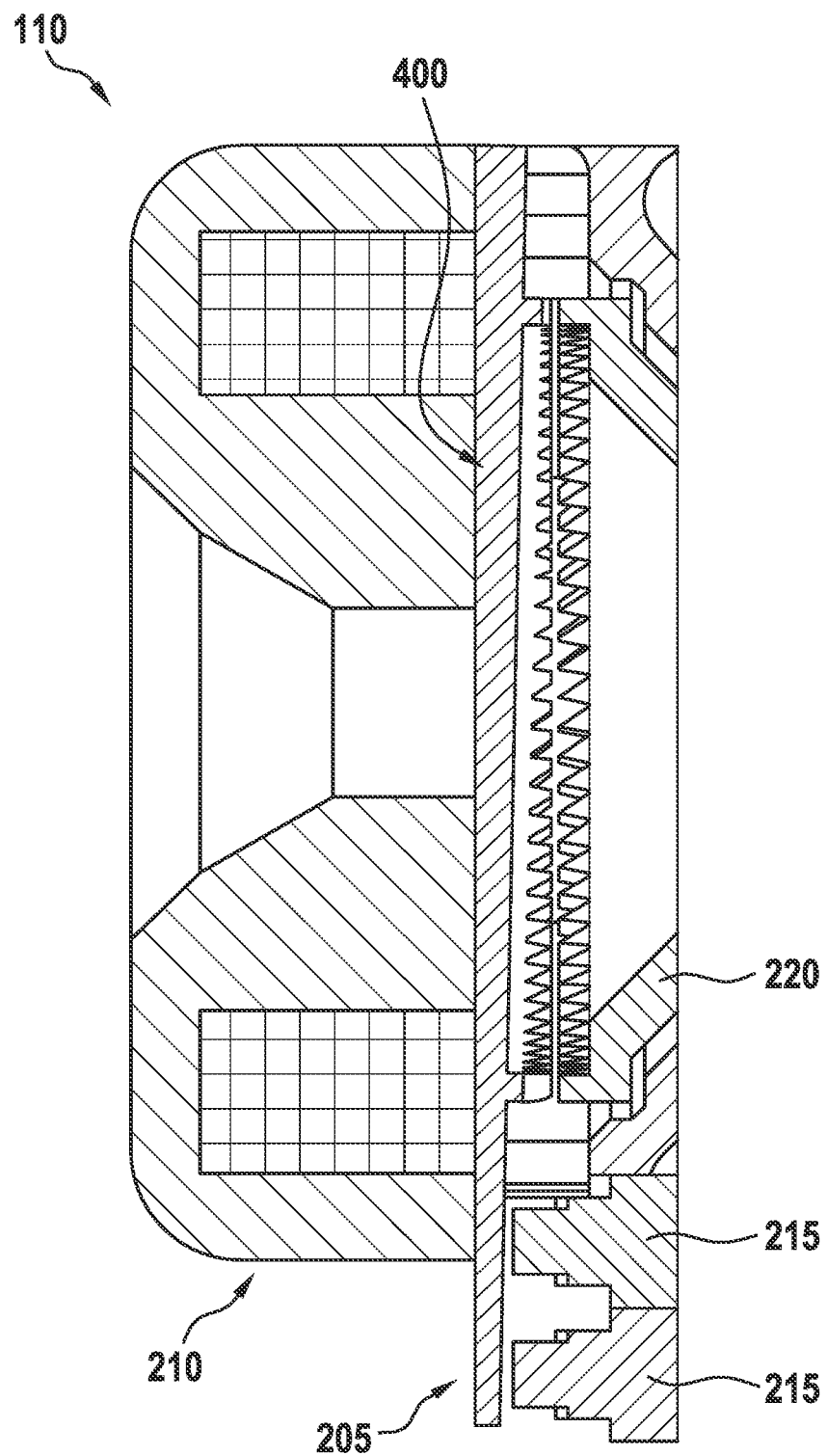

The situation which is shown in FIG. 4 shows the toothed holding brake 110 in the released position; this is called an unlocked position in the following text, in which the armature disk is arranged in a manner which is pulled by way of electromagnetic forces of a magnet of the magnet device such a distance toward the magnet device and away from the driver element that the teeth of the two toothed rims pass out of engagement, and the driver element and therefore the shaft can rotate freely in the unlocked position of the armature disk. Therefore, the shaft can rotate in both directions in the unlocked position.

The shaft optionally has a freewheel. For example, the freewheel is provided in order to always permit a rotation of the actuating shaft in one direction (in accordance with one exemplary embodiment, this is the closing direction of the door 105).

Figure 2:
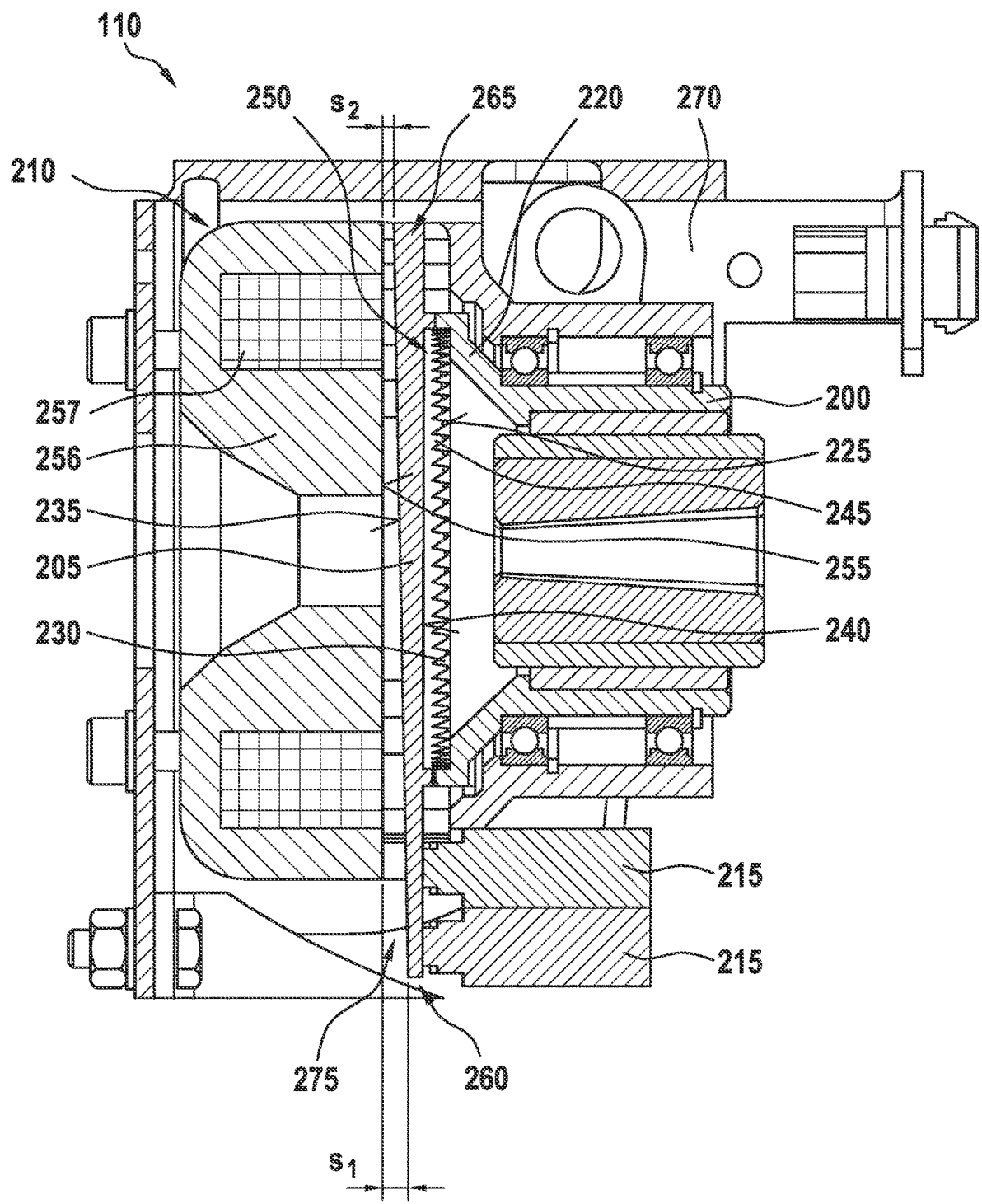

FIG. 2 shows a diagrammatic cross-sectional illustration of a toothed holding brake 110 in accordance with one exemplary embodiment. This can be an exemplary embodiment of the toothed holding brake 110 which is described on the basis of FIG. 1.

The toothed holding brake 110 has the shaft 200, the armature disk 205, the magnet device 210 and a detection device 215. At one end, the shaft 200 forms the driver element 220 with a driver main surface 225 with the driver toothed rim 230 which has a plurality of driver teeth.

The armature disk 205 has a first main surface 235 and a second main surface 240 which is arranged so as to lie opposite the first main surface 235, the armature disk toothed rim 245 with a plurality of armature teeth being arranged on the second main surface 240. The armature disk 205 is arranged in the locked position 250 such that the armature teeth engage into the driver teeth, in order to prevent a rotation of the shaft 200 in both directions or, in the case of the presence of a freewheel, in one direction, and is arranged in an unlocked position such that the armature teeth are arranged spaced apart from the driver teeth, in order to release the rotation of the shaft 200 in both directions.

The magnet device 210 has a magnet main surface 255 which is arranged so as to face the armature disk 205, the magnet device 210 being configured to move the armature disk 205 between the locked position 250 and the unlocked position. In the locked position 250 of the armature disk 205, the first main surface 235 of the armature disk 205 and the magnet main surface 255 are arranged so as to run substantially obliquely with respect to one another.

The detection device 215 is configured to detect the locked position 250 and, in addition or as an alternative, the unlocked position.

In accordance with this exemplary embodiment, the armature disk 205 is arranged in the locked position 250. The armature disk 205 is arranged between the magnet device 210 and the driver element 220. In accordance with this exemplary embodiment, the first main surface 235 of the armature disk 205 is arranged so as to face the magnet main surface 255 and, in accordance with this exemplary embodiment, the second main surface 240 of the armature disk 205 is arranged so as to face the driver main surface 225. In accordance with this exemplary embodiment, the armature disk 205 is arranged obliquely with respect to the magnet main surface 255. In accordance with this exemplary embodiment, the magnet device 210 comprises a magnet body 256 and a magnet coil 257 which is received in the magnet body 256. The magnet main surface 255 and a further magnet main surface of the magnet device 210, which further magnet main surface lies opposite the magnet main surface 255, are arranged by way of example so as to run parallel to one another.

In accordance with this exemplary embodiment, a spacing between the first main surface 235 of the armature disk 205 and the second main surface 240 of the armature disk 205 is smaller on a first side 260 of the armature disk 205 than on a second side 265 of the armature disk 205, which second side 265 lies opposite the first side 260, the second main surface 240 being arranged, in accordance with this exemplary embodiment, substantially obliquely with respect to the first main surface 235 between the first side 260 and the second side 265 or, in accordance with an alternative exemplary embodiment, the first main surface 235 being arranged so as to run substantially obliquely with respect to the second main surface 240. In accordance with this exemplary embodiment, the armature disk 205 is formed in a wedge-shaped manner.

In accordance with this exemplary embodiment, the detection device 215 is arranged and configured to make mechanical contact with the armature disk 205 in the locked position 250, and/or to not make contact with the armature disk 205 in the unlocked position and in a partially locked state which is situated between the unlocked position and the locked position. In accordance with this exemplary embodiment, the detection device 215 which is formed in the form of at least one limit switch makes contact with the armature disk 205 on the second main surface 240. In accordance with this exemplary embodiment, the detection device 215 is arranged on the first side 260 of the armature disk 206.

A casement 270 which, in accordance with one exemplary embodiment, is formed to fasten the toothed holding brake 110 to a vehicle body part is arranged in accordance with this exemplary embodiment so as to face the second side 265 and/or so as to lie opposite the detection device 215.

A wedge-shaped air gap 275 is arranged between the magnet device 210 and the armature disk 205 in the locked position 250 which is shown here. In accordance with this exemplary embodiment, the air gap 275 is wider on the first side 260 of the armature disk 205 than on the second side 265 of the armature disk 205.

In the following text, exemplary embodiments of the toothed holding brake 110 will be described again using different words:

It is a background of the approach which is presented here that it is possible for a current state (either locked or unlocked) of a toothed holding brake to be detected with the aid of limit switches. To this end, the toothed holding brake 110 has the detection device 215 which, in accordance with this exemplary embodiment, has two limit switches which are arranged above one another. In the case of the toothed holding brake 110 which is presented here, this state can advantageously be detected directly, that is without a transmission means or an additional switching element, since the locking element in the form of the armature disk 205 is sensed directly.

In the case of the toothed holding brake 110 which is presented here, a stroke extension is realized by way of the armature disk 205 which is formed as a swash plate. Since the limit switches of the detection device 215 which are used require a stroke of more than 2 or 3 mm to be able to carry out the detection properly, the armature disk 205 in accordance with this exemplary embodiment has a required stroke of from 2 to 4 mm. The air gap 275 corresponds to the stroke of the armature disk 205. In accordance with this exemplary embodiment, the armature disk 205 has a stroke of more than 3 mm between the unlocked position and the locked position 250 between the magnet device 210 and the detection device 215. In other words, a spacing between the magnet device 210 and the detection device 215 or a width of a first air gap section s1 of the air gap 275 between the magnet device 210 and the detection device 215 is more than 3 mm in size in accordance with this exemplary embodiment. Since, in the case of an increase of the stroke, the air gap 275 in the magnetic circuit is also increased or widened and a required magnetic force for unlocking becomes lower as a result, the stroke is not increased in the region of the second side 265. In accordance with this exemplary embodiment, a width of a second air gap section s2 of the air gap 275 in the region of the second side 265 is smaller than the width of the first air gap section s1. As a result, the required magnetic forces can also be achieved although a stroke extension has been realized in the region of the limit switches. In accordance with this exemplary embodiment, this air gap 275 of different width is realized by way of the oblique or wedge-shaped armature disk 205.

Figure 3:
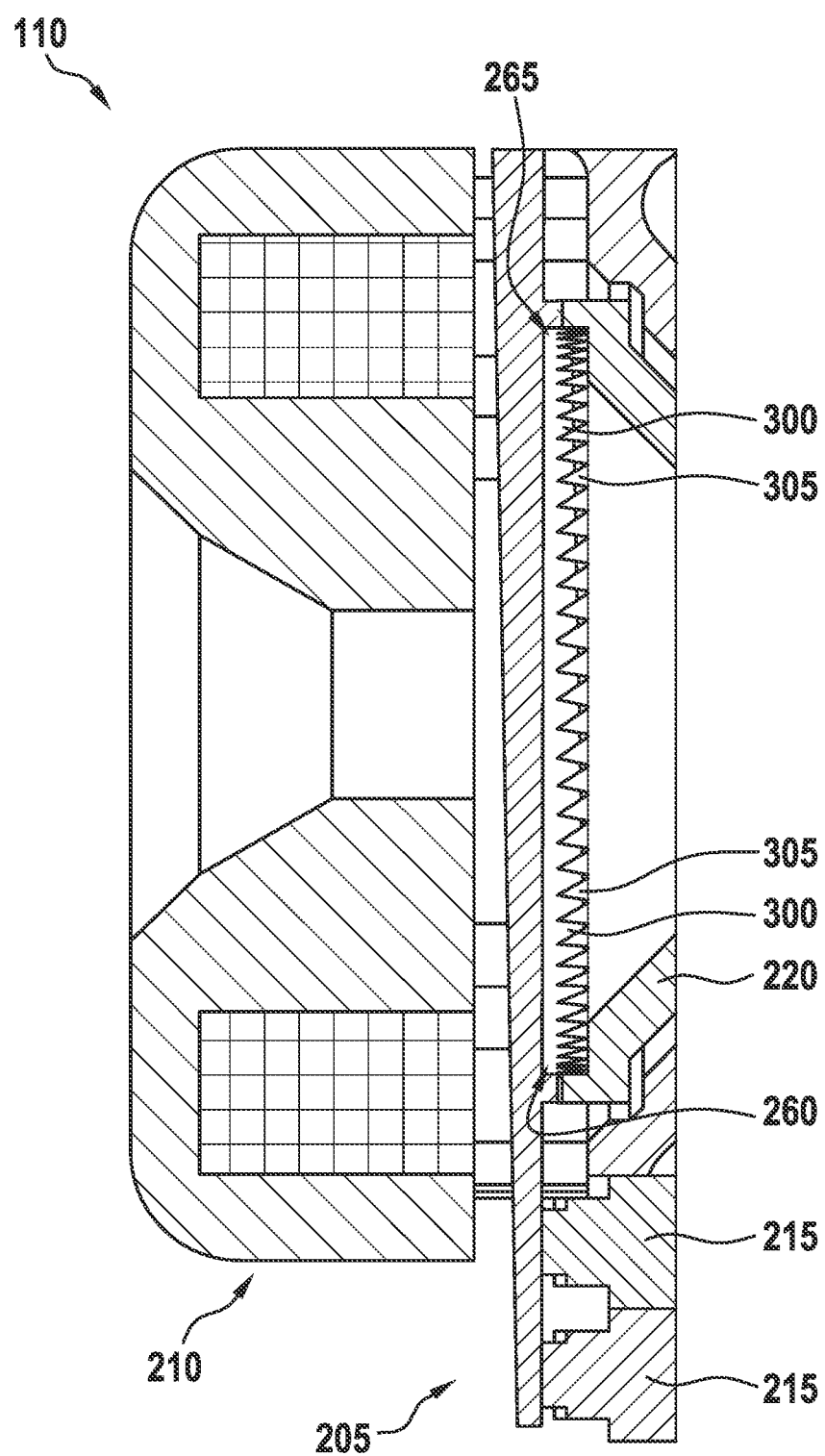

FIG. 3 shows a diagrammatic cross-sectional illustration of a toothed holding brake 110 in accordance with one exemplary embodiment. Here, this can be a detail of the toothed holding brake 110 in the locked position, which toothed holding brake 110 is described in FIG. 2.

In accordance with this exemplary embodiment, an extent length of at least a plurality of armature teeth 300 which are situated on the first side 260 is greater than an extent length of at least a plurality of armature teeth 300 which are situated on the second side 265.

In addition or as an alternative, in accordance with this exemplary embodiment, a further extent length of a plurality of driver teeth 305 which are situated on a further first side of the driver main surface is equal to a further extent length of at least a plurality of driver teeth 305 which are situated on an opposite further second side of the driver main surface. In accordance with this exemplary embodiment, the first side 260 is arranged so as to face the further first side of the driver main surface and, in accordance with this exemplary embodiment, the second side 265 is arranged so as to face the further second side of the driver main surface.

In the situation which is shown, the armature teeth 300 and the driver teeth 305 on both sides 260, 265 of the armature disk 205 engage completely into one another and make complete mechanical contact here.

In accordance with this exemplary embodiment, the extent length of the armature teeth is accordingly longer in an armature rim section of the armature disk toothed rim, which armature rim section faces the detection device 215, than in a further armature rim section of the armature disk toothed rim, which further armature rim section faces away from the detection device 215. In the case of the driver element 220, the driver teeth 305 are optionally not arranged obliquely or beveled. In accordance with this exemplary embodiment, all the driver teeth 305 have the maximum tooth height of the armature teeth 300.

In accordance with an alternative exemplary embodiment, an extent length of at least a plurality of armature teeth 300 which are situated on the first side 260 is equal to an extent length of at least a plurality of armature teeth which are situated on the second side 265, and/or a further extent length of a plurality of driver teeth 305 which are situated on a further first side of the driver main surface is greater than a further extent length of at least a plurality of driver teeth 305 which are situated on an opposite further second side of the driver main surface. In accordance with the alternative exemplary embodiment, a further extent length of the driver teeth of the driver element 220 is accordingly longer in a driver rim section of the driver toothed rim, which driver rim section faces the detection device 215, than in a further driver rim section of the driver toothed rim, which further driver rim section faces away from the detection device 215.

In the following text, exemplary embodiments of the toothed holding brake 110 are described again using different words:

According to this exemplary embodiment, the toothed holding brake 110 makes it possible to ensure a correct detection by means of different tooth heights. In the case of a temporal sequence of detection by means of limit switches of the detection device 215, it is to be noted that, in the case of a locking operation, mechanical locking is first of all carried out, that is to say the teeth 300, 305 are in engagement with one another, and only afterward does the limit switch report the locked state. In the case of an unlocking operation, the limit switch is to first of all detect the unlocked state before the teeth are out of engagement. This ensures that a non-permitted "mechanically unlocked and electrically locked" state does not occur. Since the limit switches of the detection device 215 have a switching hysteresis, a switching point and a reset point being offset by more than 1 mm in accordance with one exemplary embodiment, it is necessary for the direct sensing of the armature disk that the height of the armature teeth 300 or driver teeth 305 in accordance with this exemplary embodiment are greater than 1 mm, since otherwise, although the switching point lies within the tooth engagement, the reset point lies outside the tooth engagement, and therefore the non-permitted "mechanically unlocked and electrically locked" state might occur briefly. In the case of the toothed holding brake 110 which is presented here, this undesired non-permitted state is prevented thanks to the long teeth 300, 305 in the region of the detection device 215, see also FIG. 6 in this regard. An alternative possible corrective measure is to elevate the teeth generally, but the problem would then occur in the region of the second air gap section that, as a result, the stroke, that is to say a width of the second air gap, would also have to be increased. This would in turn have an influence on the magnetic forces which can be achieved, which is not desirable.

On the basis of one exemplary embodiment, the following text explains the way in which the armature teeth 300 and the driver teeth 305 come into engagement or remain under the influence of torque. In the case of this exemplary embodiment, a magnetic force of the magnet device 210 is used for the unlocking operation.

In the case of this exemplary embodiment, the tooth engagement takes place by virtue of the fact that the armature disk 205 is pressed by the magnet body of the magnet device 210 in the direction of the driver element 220 via a spring force of at least one spring. The at least one spring defines, together with the tooth shape of the armature teeth 300 and the driver teeth 305 including the existing friction conditions, the possible holding torque of the toothed holding brake 110. Here, the angles of the armature teeth 300 and the driver teeth 305 can be selected to be different in the two rotational directions. The flatter the angle, the less holding torque there is in the case of otherwise identical conditions. The magnetic force of the magnet device 210 which is required for disconnecting the armature disk 205 from the driver element 220 results from the selected at least one spring, the tooth shape and the prevailing torque in the case of the unlocking operation.

FIG. 4 shows a diagrammatic cross-sectional illustration of a toothed holding brake 110 in accordance with one exemplary embodiment. This can be the toothed holding brake 110 which is described in FIG. 3, with the difference that the armature disk 205 according to this exemplary embodiment is arranged in the unlocked position 400.

In the unlocked position 400, the armature disk 205 is arranged spaced apart from the driver element 220 and does not make contact with the latter. A continuous gap is arranged between the armature teeth and the driver teeth. The armature disk 205 does not make contact with the detection device 215. In accordance with this exemplary embodiment, the first main surface of the armature disk 205 bears against the magnet main surface of the magnet device 210. In accordance with this exemplary embodiment, the armature disk 205 bears over an entire length of the magnet main surface flush against the magnet main surface here.

If the toothed holding brake 110 is transferred from the unlocked position 400 which is shown in FIG. 4 into the locked position which is shown in FIG. 3, armature teeth and driver teeth already engage partially into one another in accordance with one exemplary embodiment at least on the first side of the armature disk 205, that is to say in the region of the detection device 215, without a locked signal being output by the detection device 215. The locked signal is output by the detection device 215 only when the armature teeth and driver teeth engage even further into one another, that is to say a first partially locked state, also called a switching point, is reached.

If the toothed holding brake 110 is transferred from the locked position which is shown in FIG. 3 into the unlocked position 400 which is shown in FIG. 4, the armature teeth and driver teeth still engage partially into one another in accordance with one exemplary embodiment at least on the first side of the armature disk 205, that is to say in the region of the detection device 215, an unlocked signal being output by the detection device 215. Therefore, the unlocked signal is already output while the armature teeth and driver teeth are still engaging into one another, that is to say a second partially locked state, also called a reset point, is reached. Here, the first partially locked state and the second partially locked state can correspond to one another or can differ. For example, the first partially locked state is assigned a greater engagement depth between the armature teeth and driver teeth than the second partially locked state.

Figure 5:
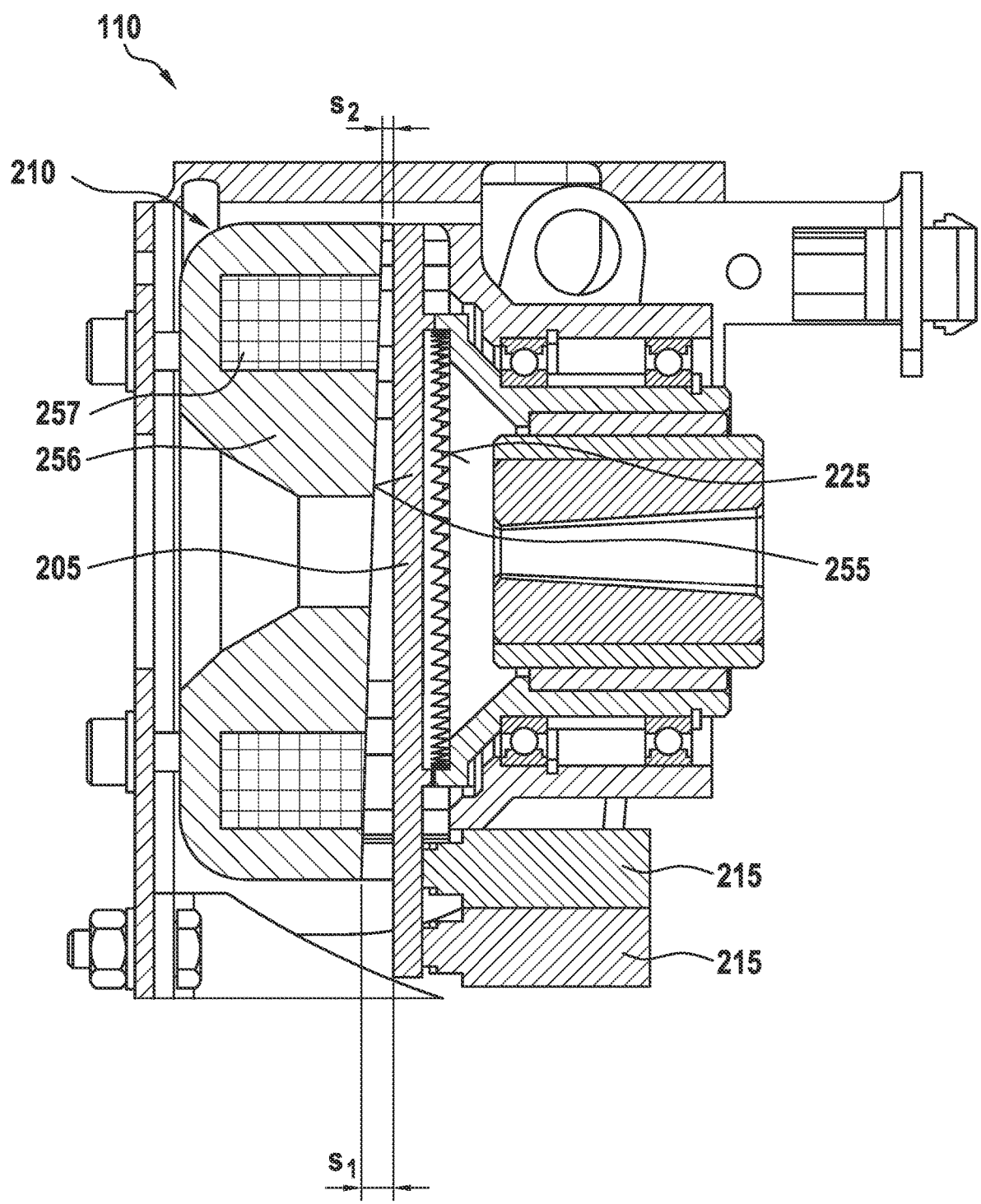

FIG. 5 shows a diagrammatic cross-sectional illustration of a toothed holding brake 110 in accordance with one exemplary embodiment. This can be one of the toothed holding brakes 110 in the locked position which are described in one of the preceding Figures, with the difference that the magnet main surface 155 in accordance with this exemplary embodiment is arranged so as to run substantially obliquely with respect to the driver main surface 225. In accordance with this exemplary embodiment, the magnet main surface 255 is arranged so as to run obliquely with respect to the further magnet main surface of the magnet device 210. Accordingly, the magnet device 210 is of wedge-shaped configuration overall. A spacing between the magnet main surface 255 and the further magnet main surface is smaller in a region of the magnet device 210, which region faces the detection device, than a spacing between the magnet main surface 255 and the further magnet main surface on a region of the magnet device 210, which region faces the casement.

In accordance with this exemplary embodiment, the magnet main surface 155 is arranged substantially obliquely with respect to the first main surface of the armature disk.

In accordance with this exemplary embodiment, the first main surface and the second main surface of the armature disk 205 are oriented so as to run parallel to one another, as a result of which the armature disk 205 in accordance with this exemplary embodiment is not formed in a wedge-shaped manner. In accordance with this exemplary embodiment, an angle between the magnet main surface 255 and the first main surface corresponds to an angle which is shown in the preceding Figures between the magnet main surface 255 and the first main surface in the locked position.

In accordance with an alternative exemplary embodiment, a form of the armature disk 205 corresponds to the wedge-shaped armature disk 205 which are described in one of FIGS. 1 to 4. A stroke of the armature disk 205 is then greater in accordance with the alternative exemplary embodiment.

Figure 6:
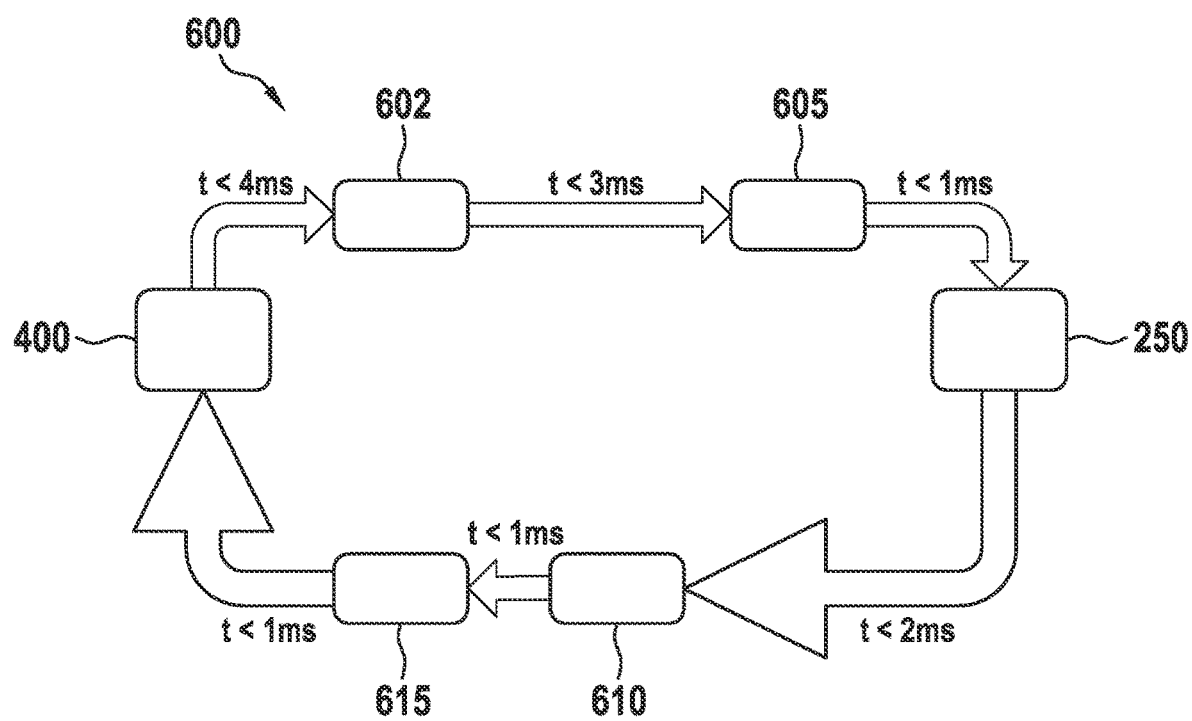
FIG. 6 shows a state diagram of a toothing system of a toothed holding brake in accordance with one exemplary embodiment.

FIG. 6 shows a state diagram 600 of a toothing system of a toothed holding brake in accordance with one exemplary embodiment. This can be one of the toothed holding brakes which are described in one of the preceding Figures with different tooth heights. In accordance with this exemplary embodiment, a stroke of the armature disk from the unlocked position 400 to the locked position 250 is more than 3 mm between the magnet device and a limit switch, 3.6 mm by way of example here.

In accordance with this exemplary embodiment, a first block of the state diagram 600 characterizes the unlocked position 400. In accordance with this exemplary embodiment, a tooth engagement of the toothed holding brake is −1.1 mm in the unlocked position 400, and a gap between the armature disk and the magnet device is 0 mm A toothing system is unlocked in the unlocked position 400, and the detection device sends or provides a limit switch signal in the form of an unlocked signal which represents the unlocked position 400 of the toothed holding brake, since the armature disk does not make mechanical contact with the detection device. In the case of a locking operation which is described in the following text from the unlocked position 400 to the locked position 250, the toothed holding brake passes a partially locked state 602 and a switching point 605. In accordance with this exemplary embodiment, after less than four milliseconds, the toothed holding brake is arranged such that it has been moved from the unlocked position 400 into the partially locked state 602. In the partially locked state 602, the teeth are arranged so as to be in engagement with a tooth engagement of more than 0 mm A gap between the magnet device and the armature disk is more than 1.1 mm in accordance with this exemplary embodiment in the region of the detection device in the partially locked state 602. A toothing system is locked in the partially locked state 602, and the detection device sends or provides the limit switch signal which represents the unlocked position 400 of the toothed holding brake, since the armature disk does not make mechanical contact with the detection device. After less than three milliseconds, the toothed holding brake according to this exemplary embodiment is arranged such that it is moved from the partially locked state 602 to the switching point 605. In accordance with this exemplary embodiment, the switching point 605 is reached in the case of a tooth engagement of between 1.55 and 2.25 mm A gap between the magnet device and the armature disk is from 2.65 to 3.35 mm in accordance with this exemplary embodiment in the region of the detection device when the switching point 605 is reached. A toothing system is locked at the switching point 605, and the detection device sends or provides a limit switch signal in the form of a locked signal which represents the locked position 250 of the toothed holding brake, since the armature disk now makes mechanical contact with the detection device. After less than one millisecond, the toothed holding brake in accordance with this exemplary embodiment is arranged such that it has been moved from the switching point 605 into the locked position 250. In the locked position 250, the tooth engagement is 2.5 mm in accordance with this exemplary embodiment. In accordance with this exemplary embodiment, a gap between the magnet device and the armature disk is 3.6 mm in the region of the detection device in the locked position 250. A toothing system is locked in the locked position 250, and the detection device sends or provides the limit switch signal which represents the locked position 250 of the toothed holding brake, since the armature disk makes mechanical contact with the detection device.

In the case of an unlocking operation which is described in the following text from the locked position 250 to the unlocked position 400, the toothed holding brake passes a reset point 610 and a released state 615. In accordance with this exemplary embodiment, after less than two milliseconds, the toothed holding brake reaches the reset point 610 from the locked position 250. According to this exemplary embodiment, the reset point 610 is reached in the case of a tooth engagement between 1.05 and 0.35 mm. In accordance with this exemplary embodiment, a gap between the magnet device and the armature disk is from 2.15 to 1.45 mm in the region of the detection device when the reset point 610 is reached. A toothing system is locked at the reset point 610, and the detection device sends or provides the limit switch signal which represents the unlocked position 400 of the toothed holding brake, since the armature disk does not make mechanical contact with the detection device. According to this exemplary embodiment, after less than one millisecond, the toothed holding brake reaches the released state 615 from the reset point 610. In accordance with this exemplary embodiment, the released state 615 is reached in the case of a tooth engagement of 0 mm. In accordance with this exemplary embodiment, a gap between the magnet device and the armature disk is 1.1 mm or less in the region of the detection device in the released state 615. A toothing system is unlocked in the released state 615, and the detection device sends or provides the limit switch signal which represents the unlocked position 400 of the toothed holding brake, since the armature disk does not make mechanical contact with the detection device. In accordance with this exemplary embodiment, after less than one millisecond, the toothed holding brake reaches the unlocked position 400 from the released state 615.

In order not to have a negative influence on the magnetic forces, only the teeth in the region of the first air gap section, that is to say the teeth which are arranged so as to face the detection device, are formed to be substantially elevated, since the stroke, that is to say the air gap, is also greater than 3 mm here. In the region of the opposite second air gap section, the tooth heights remain unchanged or shorter. This ensures that the switching point 605 and the reset point 610 lie within the tooth engagement.

Figure 7:
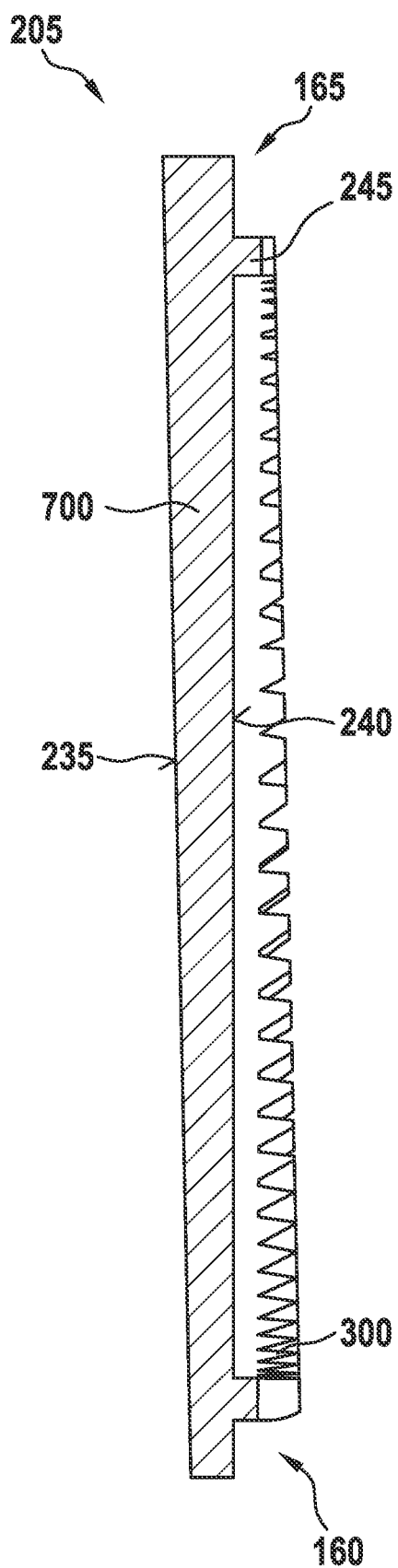
FIG. 7 shows a lateral cross-sectional illustration of an armature disk of a toothed holding brake in accordance with one exemplary embodiment.

FIG. 7 shows a lateral cross-sectional illustration of an armature disk 205 of a toothed holding brake in accordance with one exemplary embodiment. This can be one of the armature disks 205 which are described in one of the preceding Figures with different tooth heights. In accordance with this exemplary embodiment, the armature disk toothed rim 245 is arranged on the second main surface 240. The armature teeth 300 of the armature disk toothed rim 245 protrude completely or partially beyond the second main surface 240. A base plane 700 of the armature disk 205 is formed in a wedge-shaped manner in section in accordance with this exemplary embodiment. The armature disk toothed rim 245 is overall likewise formed in a wedge-shaped manner in section. In accordance with this exemplary embodiment, an imaginable connecting line of the tips of the armature teeth 300 and the first main surface 235 are oriented parallel to one another.

In accordance with this exemplary embodiment, the armature disk 205 is produced such that first of all a complete toothing system with a maximum height has been manufactured. Afterward, the teeth have been milled off correspondingly, the milling tool having moved here on a plane which lies obliquely with respect to the second main surface 240 of the base plane 700. The armature teeth 300 on the first side 160 have not been milled off, and the armature teeth 300 on the second side 165 have been reduced to a maximum extent. In accordance with one exemplary embodiment, first of all an oblique plane has been milled in a manner which is appropriate in terms of manufacturing technology, and afterward the armature teeth 300 have been manufactured. Here, the tooth milling tool has dipped to a greater or lesser depth into the material.

Figure 8:
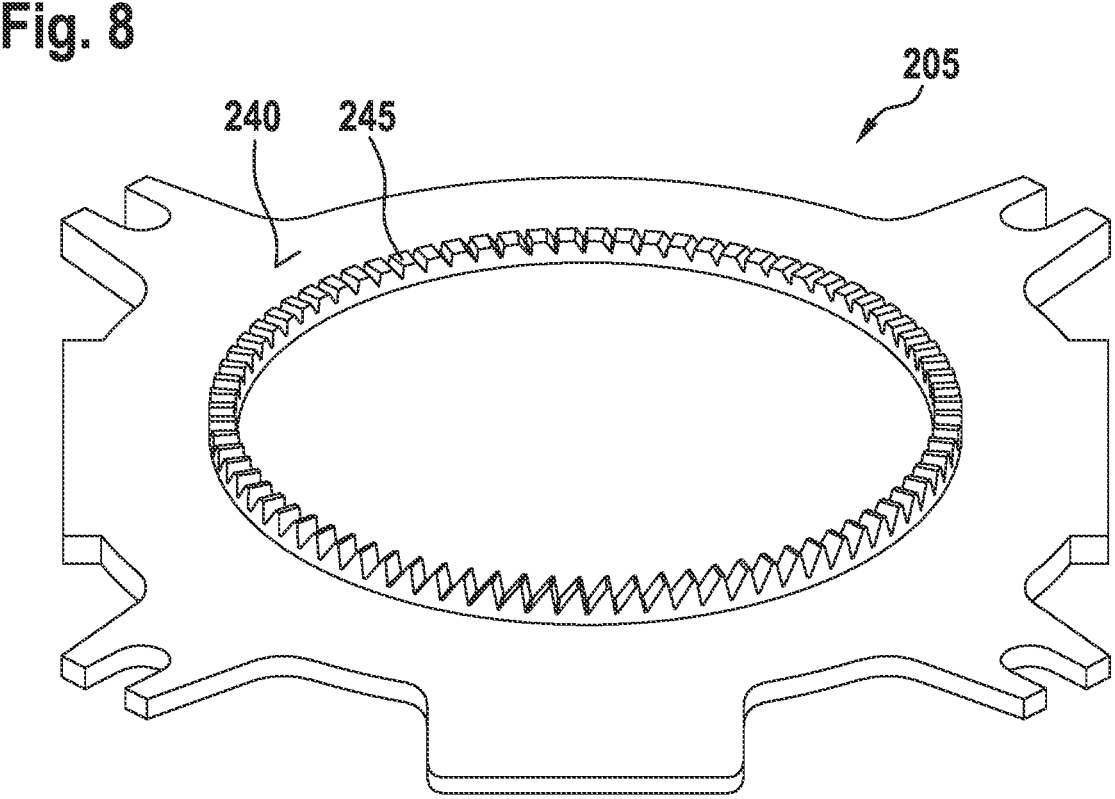
FIG. 8 shows a perspective plan view of an armature disk of a toothed holding brake in accordance with one exemplary embodiment.

FIG. 8 shows a perspective plan view of an armature disk 205 of a toothed holding brake in accordance with one exemplary embodiment. This can be the armature disk 205 which is described in FIG. 7. The second main surface 240 can be seen which, in accordance with this exemplary embodiment, represents a planar base face, from which the armature disk toothed rim 245 projects. At the edge, the armature disk 205 has a plurality of indentations which, in the mounted state of the armature disk 205, can be used, for example, to prevent a rotational movement of the armature disk 205.

Figure 9:
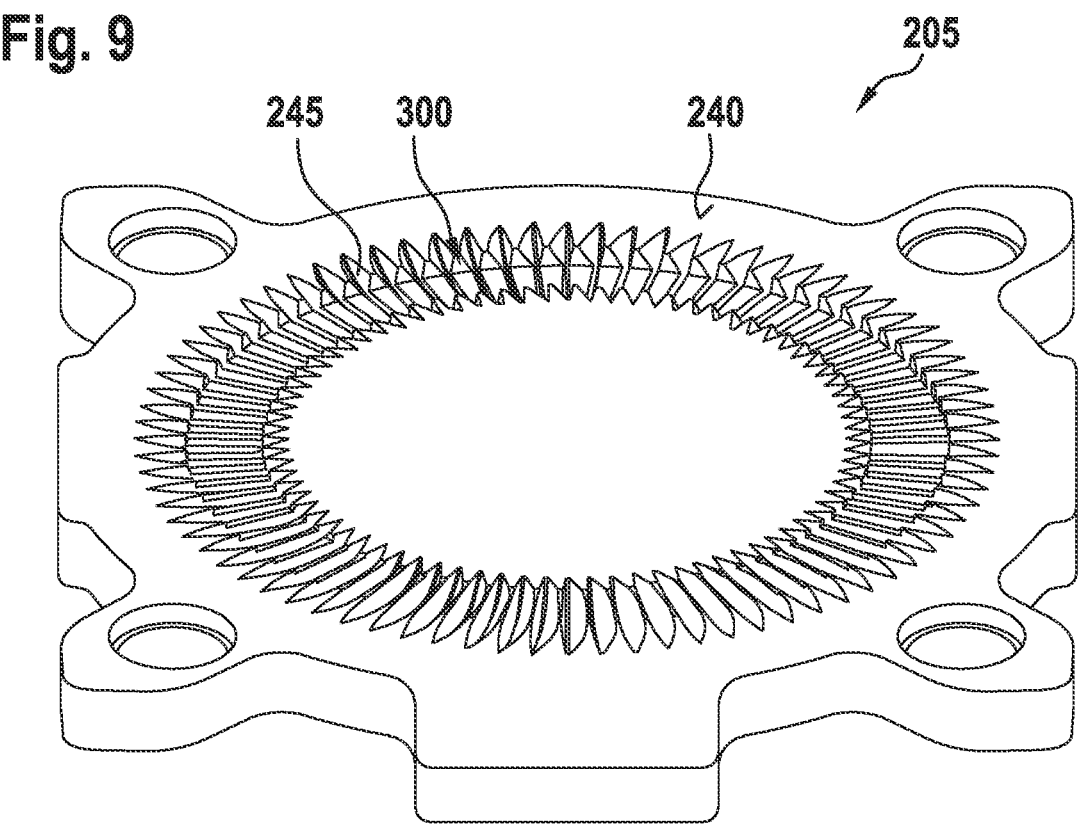
FIG. 9 shows a perspective plan view of an armature disk of a toothed holding brake in accordance with one exemplary embodiment.

FIG. 9 shows a perspective view of an armature disk 205 of a toothed holding brake in accordance with one exemplary embodiment. This can be an armature disk 205 which corresponds to the armature disk which is described in FIG. 8 with different tooth heights, with the difference that the armature disk toothed rim 245 in accordance with this exemplary embodiment is arranged in a recess which is arranged in the second main surface 240. In accordance with this exemplary embodiment, the armature teeth 300 of the armature disk toothed rim 245 are arranged in a depressed manner with respect to the second main surface 240.

One exemplary embodiment shown here of the armature disk 205 realizes a variant which is optimized in terms of manufacturing and space of the armature disk 205 which is shown in FIGS. 7 to 8. In accordance with this exemplary embodiment, the armature teeth 300 are integrated into the armature disk 205.

Figure 10:
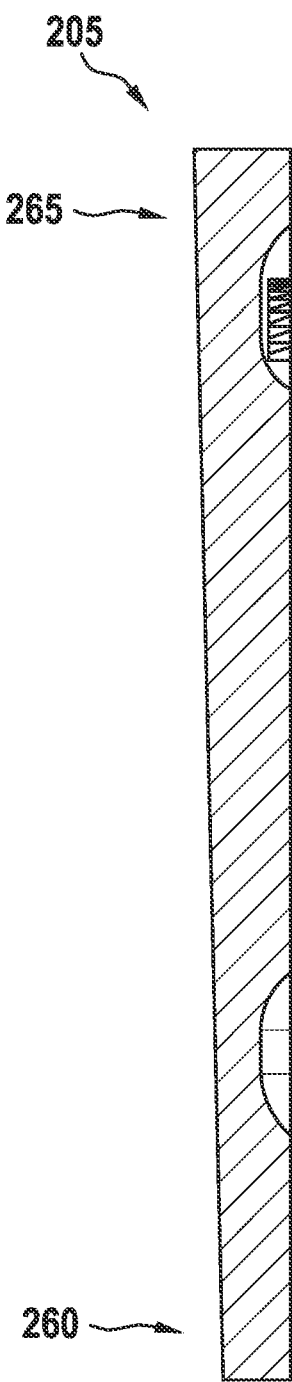
FIG. 10 shows a lateral cross-sectional illustration of an armature disk of a toothed holding brake in accordance with one exemplary embodiment.

FIG. 10 shows a lateral cross-sectional illustration of an armature disk 205 of a toothed holding brake in accordance with one exemplary embodiment. This can be the armature disk 205 which is described in FIG. 9. It can be seen that, starting from the second side 265, the armature disk 205 tapers in the direction of the first side 260. Therefore, the armature disk 205 has a smaller thickness on the first side 260 than on the second side 265.

Figure 11:
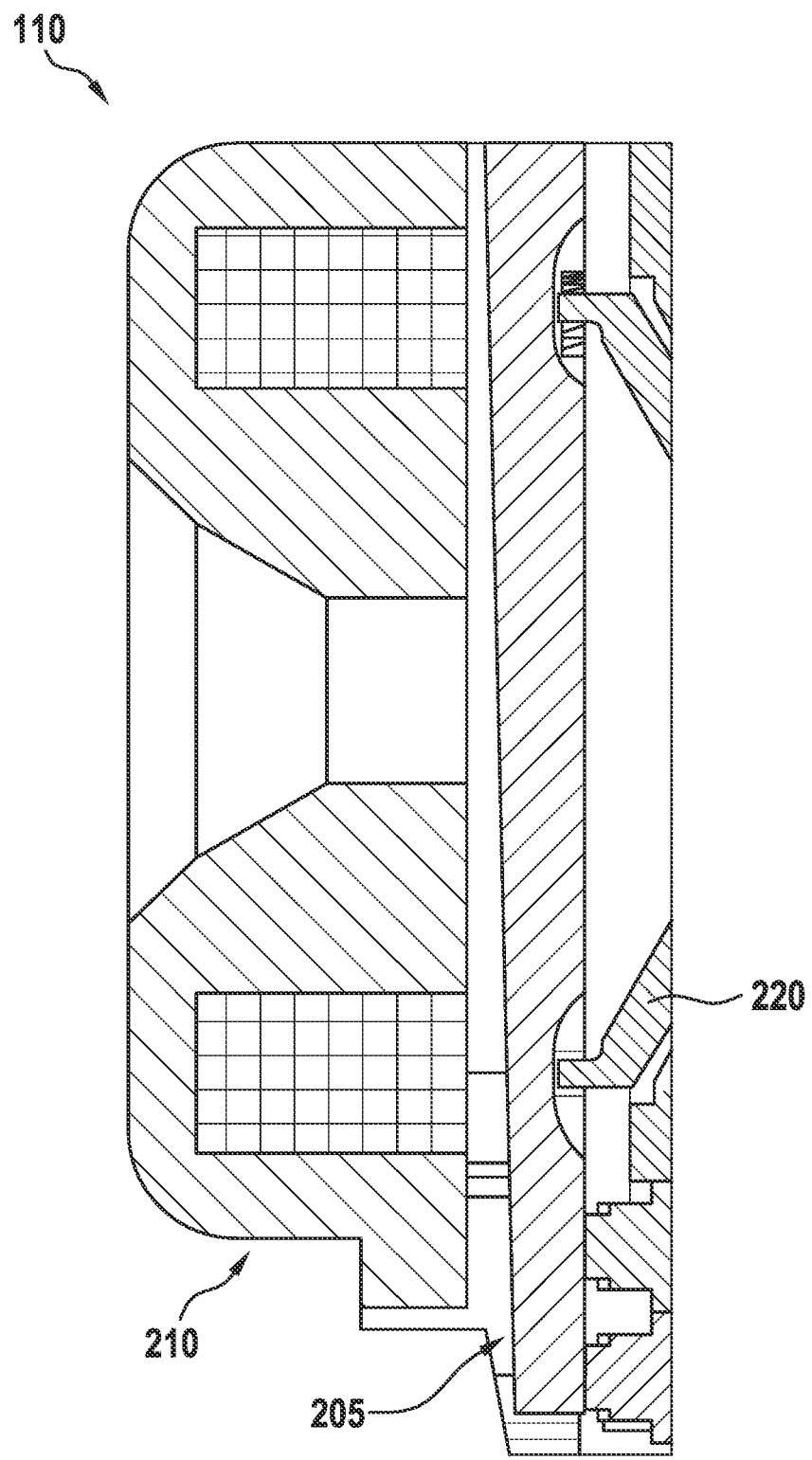
FIG. 11 shows a diagrammatic cross-sectional illustration of a toothed holding brake in accordance with one exemplary embodiment.

FIG. 11 shows a diagrammatic cross-sectional illustration of a toothed holding brake 110 in accordance with one exemplary embodiment. This can be one of the toothed holding brakes 110 in the locked position which are described in one of FIGS. 1 to 4, the toothed holding brake 110 in accordance with this exemplary embodiment having the armature disk 205 which is described in FIGS. 9 to 10 with integrated armature teeth.

In accordance with an alternative exemplary embodiment, the armature teeth on the armature disk are of identical height circumferentially, and the driver teeth of the driver element 220 are realized with a different height or obliqueness and/or the driver teeth are integrated into the driver element 220.

Figure 12:
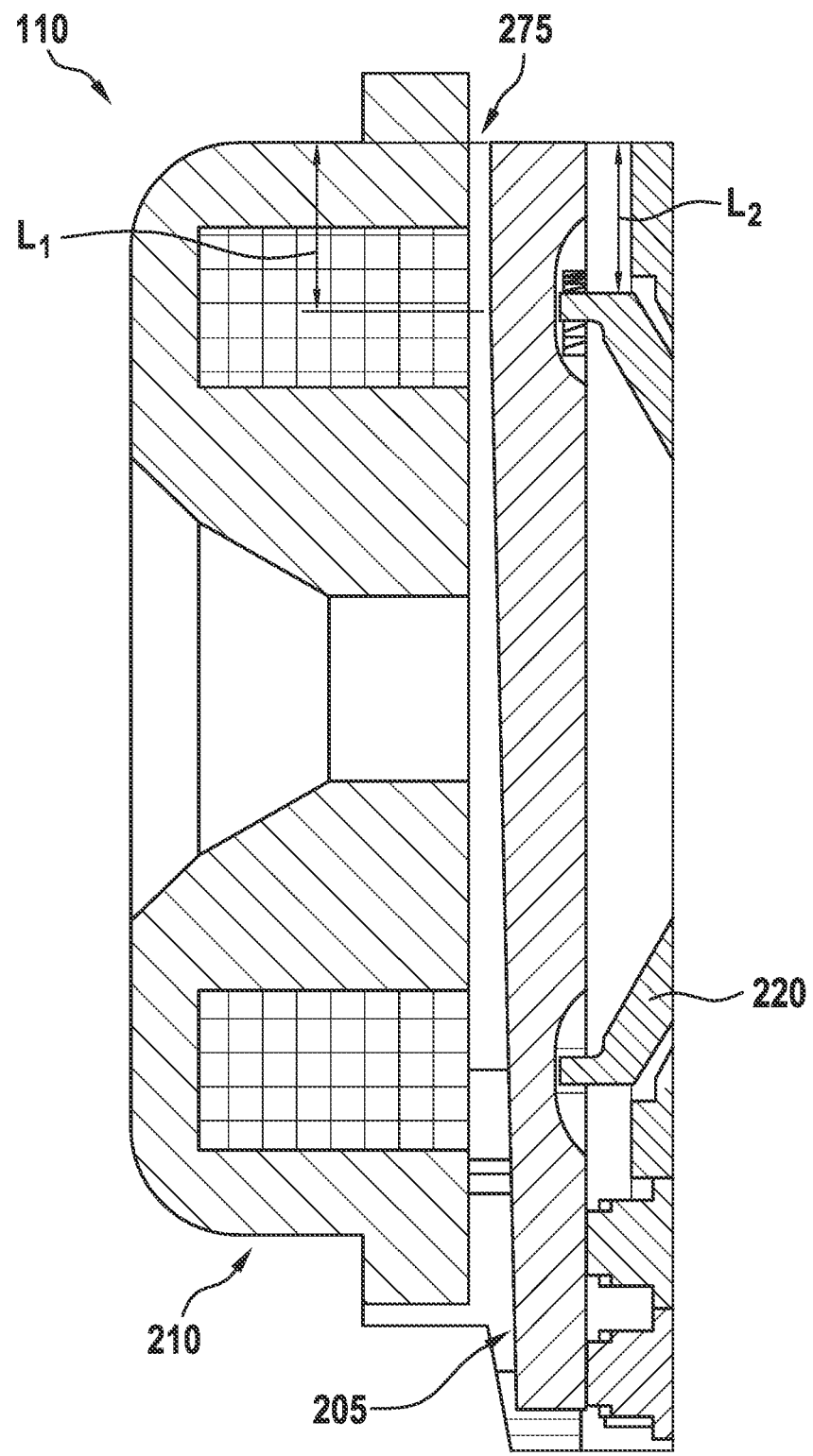
FIG. 12 shows a diagrammatic cross-sectional illustration of a toothed holding brake in accordance with one exemplary embodiment.

FIG. 12 shows a diagrammatic cross-sectional illustration of a toothed holding brake 110 in accordance with one exemplary embodiment. This can be the toothed holding brake 110 which is described in FIG. 11, with the difference that, in accordance with this exemplary embodiment, a first surface section L1 of the first main surface on the second side of the armature disk 205 and an opposite second surface section L2 of the second main surface on the second side are arranged parallel to one another.

In accordance with this exemplary embodiment, an increase of the magnetic force is realized on account of a flat area. Here, in order to increase the magnetic forces on the armature disk 205, the air gap 275 is kept constant or parallel over a region which adjoins the first surface section L1, and the air gap 275 increases only afterward, that is to say expands only afterward in a wedge-shaped manner toward the detection device. As a result, in the case of the unlocking operation, a tilting movement of the armature disk 205 is produced. First of all, in the case of unlocking, the armature disk 205 bears flatly in the region of the first surface section L1 against an opposite magnet main surface section of the magnet main surface of the magnet device 210, and then tilts onto the remaining large area of the magnet main surface. In accordance with this exemplary embodiment, the first surface section L1 and/or the second surface section L2 have/has a length of one seventh of an overall length of the first and/or second main surface. In accordance with an alternative exemplary embodiment, the armature disk 205 which is described in FIGS. 7 to 8 has the surface sections L1, L2 which are presented here.

Figure 13:
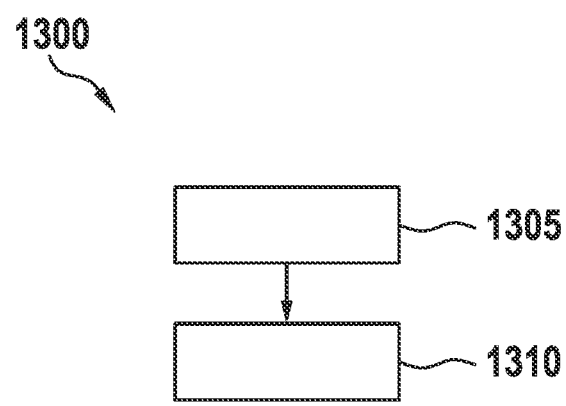
FIG. 13 shows a flow chart of a method for operating a toothed holding brake in accordance with one exemplary embodiment.

FIG. 13 shows a flow chart of a method 1300 for operating a toothed holding brake in accordance with one exemplary embodiment. This can be one of the toothed holding brakes which are described in one of FIG. 1, 2, 3, 4, 5, 6, 11 or 12.

The method 1300 comprises an operation 1305 of effecting and an operation 1310 of triggering. In the operation of effecting 1305, a movement of the armature disk from the unlocked position into the locked position is effected, in order to prevent the rotation of the shaft in at least one direction. In the operation 1310 of triggering, a movement of the armature disk from the locked position into the unlocked position is triggered, in order to release the rotation of the shaft in both directions.

In accordance with this exemplary embodiment, the operation of effecting 1305 is carried out before or, in accordance with an alternative exemplary embodiment, after the operation 1310 of triggering.

The method operations which are presented here can be carried out in a repeated manner and in a sequence other than the sequence which is described, in order to effect alternate releasing and locking of the shaft.

If one exemplary embodiment comprises an "and/or" link between a first feature and a second feature, this is to be understood such that the exemplary embodiment in accordance with one embodiment has both the first feature and the second feature and, in accordance with a further embodiment, has either only the first feature or only the second feature.

LIST OF DESIGNATIONS $L_1$ First surface section
$L_2$ Second surface section
$s_1$ First air gap section
$s_2$ Second air gap section
100 Vehicle
105 Door
110 Toothed holding brake
200 Shaft
205 Armature disk
210 Magnet device
215 Detection device
220 Driver element
225 Driver main surface
230 Driver toothed rim
235 First main surface
240 Second main surface
245 Armature disk toothed rim
250 Locked position
255 Magnet main surface
256 Magnet body
257 Magnet coil
260 First side
265 Second side
270 Casement
275 Air gap
300 Armature teeth
305 Driver teeth
400 Unlocked position
600 State diagram
602 Partially locked state
605 Switching point
610 Reset point
615 Released state
700 Base plane
1300 Method for operating a toothed holding brake
1305 Step of effecting
1310 Step of triggering

The invention claimed is:

1. A toothed holding brake for a door for a vehicle, the toothed holding brake comprising:
a shaft, which, at one end, forms a driver element with a driver main surface with a driver toothed rim, which has a plurality of driver teeth;
an armature disk, which has a first main surface and a second main surface, which is arranged so as to lie opposite the first main surface, an armature disk toothed rim with a plurality of armature teeth being arranged on the second main surface, the armature disk being arranged in a locked position such that the armature teeth engage into the driver teeth, to prevent a rotation of the shaft in at least one direction, and being arranged in an unlocked position such that the armature teeth are arranged spaced apart from the driver teeth to release the rotation of the shaft in both directions;
a magnet device with a magnet main surface which is arranged so as to face the armature disk, the magnet being configured to move the armature disk between the locked position and the unlocked position, the first main surface of the armature disk and the magnet main surface being arranged so as to run substantially obliquely with respect to one another in the locked position of the armature disk; and a detection device, which is configured to detect the locked position and/or the unlocked position, the detection device being arranged in a region of a first side of the armature disk.

2. The toothed holding brake of claim 1, wherein the armature disk is arranged between the magnet device and the shaft, a wedge-shaped air gap is arranged between the magnet device and the armature disk is in the locked position.

3. The toothed holding brake of claim 2, wherein the air gap is wider on the first side of the armature disk than on a second side of the armature disk, and the second side lies opposite the first side.

4. The toothed holding brake of claim 1, wherein the armature disk is wedge shaped.

5. The toothed holding brake of claim 1, wherein a spacing between the first main surface of the armature disk and the second main surface of the armature disk is smaller on the first side of the armature disk than on a second side of the armature disk, and wherein the second side lies opposite the first side, the first main surface and the second main surface is arranged so as to run substantially obliquely with respect to one another between the first side and the second side.

6. The toothed holding brake of claim 1, wherein a first extent length of at least a plurality of the armature teeth situated on the first side is identical to an extent length of at least a plurality of the armature teeth situated on a second side, and/or an extension length of a plurality of the driver teeth situated on a further first side of the driver main surface is greater than an extension length of at least a plurality of the driver teeth situated on an opposite further second side of the driver main surface.

7. The toothed holding brake of claim 1, wherein an extent length of at least a plurality of the armature teeth situated on the first side is greater than an extent length of at least a the plurality of armature teeth situated on a second side which lies opposite the first side, and/or an extension length of a plurality of the driver teeth situated on a further first side of the driver main surface is identical to an length of at least a plurality of driver teeth situated on an opposite further second side of the driver main surface.

8. The toothed holding brake of claim 1, wherein a first surface section of the first main surface on a second side of the armature disk, and an opposite second surface section of the second main surface on the second side are arranged parallel to one another.

9. The toothed holding brake of claim 1, wherein the magnet main surface is arranged so as to run substantially obliquely with respect to the driver main surface.

10. The toothed holding brake of claim 1, wherein the detection device is arranged and configured to make mechanical contact with the armature disk in the locked position, and/or not to make contact with the armature disk in the unlocked position and in a partially locked state, which is situated between the unlocked position and the locked position.

11. A method for operating a toothed holding brake for a door of a vehicle, the method comprising:
effecting a movement of an armature disk from an unlocked position into a locked position to prevent rotation of a shaft in at least one direction; and
triggering a movement of the armature disk from the locked position into the unlocked position to release the rotation of the shaft in both directions,
wherein the shaft of the toothed holding brake, at one end, forms a driver element with a driver main surface with a driver toothed rim, which has a plurality of driver teeth,
wherein the armature disk, which has a first main surface and a second main surface, which is arranged so as to lie opposite the first main surface, an armature disk toothed rim with a plurality of armature teeth being arranged on the second main surface, the armature disk being arranged in the locked position such that the armature teeth engage into the driver teeth, to prevent rotation of the shaft in the at least one direction, and being arranged in the unlocked position such that the armature teeth are arranged spaced apart from the driver teeth to release the rotation of the shaft in both directions,
wherein a magnet device with a magnet main surface is arranged so as to face the armature disk, the magnet device being configured to move the armature disk between the locked position and the unlocked position, the first main surface of the armature disk and the magnet main surface being arranged so as to run substantially obliquely with respect to one another in the locked position of the armature disk, and
wherein a detection device is configured to detect the locked position and/or the unlocked position, the detection device being arranged in the region of a first side of the armature disk.

12. The method of claim 11, wherein the armature disk is arranged between the magnet device and the shaft, a wedge-shaped air gap is arranged between the magnet device and the armature disk is in the locked position.

13. The method of claim 12, wherein the air gap is wider on the first side of the armature disk than on a second side of the armature disk, and the second side lies opposite the first side.

14. The method of claim 11, wherein the armature disk is wedge shaped.

15. The method of claim 11, wherein a spacing between the first main surface of the armature disk and the second main surface of the armature disk is smaller on the first side of the armature disk than on a second side of the armature disk, and wherein the second side lies opposite the first side, the first main surface and the second main surface is arranged so as to run substantially obliquely with respect to one another between the first side and the second side.

16. The method of claim 11, wherein a first extent length of at least a plurality of the armature teeth situated on the first side is identical to an extent length of at least a plurality of the armature teeth situated on a second side, and/or an extension length of a plurality of the driver teeth situated on a further first side of the driver main surface is greater than an extension length of at least a plurality of the driver teeth situated on an opposite further second side of the driver main surface.

17. The method of claim 11, wherein an extent length of at least a plurality of the armature teeth situated on the first side is greater than an extent length of at least a plurality of armature teeth situated on a second side which lies opposite the first side, and/or an extension length of a plurality of the driver teeth situated on a further first side of the driver main surface is identical to a further extension length of at least a plurality of driver teeth situated on an opposite further second side of the driver main surface.

18. The method of claim 11, wherein a first surface section of the first main surface on a second side of the armature disk, and an opposite second surface section of the second main surface on the second side are arranged parallel to one another.

19. The method of claim 11, wherein the magnet main surface is arranged so as to run substantially obliquely with respect to the driver main surface.

20. The method of claim 11, wherein the detection device is arranged and configured to make mechanical contact with the armature disk in the locked position, and/or not to make contact with the armature disk in the unlocked position and in a partially locked state, which is situated between the unlocked position and the locked position.

* * * * *